(12) United States Patent
Sonoda

(10) Patent No.: US 7,990,448 B2
(45) Date of Patent: Aug. 2, 2011

(54) SOLID-STATE IMAGE PICKUP APPARATUS AND METHOD FOR DRIVING THE SAME

(75) Inventor: Kazuhiro Sonoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 198 days.

(21) Appl. No.: 12/038,856

(22) Filed: Feb. 28, 2008

(65) Prior Publication Data

US 2008/0225145 A1 Sep. 18, 2008

(30) Foreign Application Priority Data

Mar. 15, 2007 (JP) ................................. 2007-066771
Oct. 3, 2007 (JP) ................................. 2007-259854

(51) Int. Cl.
*H04N 5/335* (2011.01)
(52) U.S. Cl. .......................... 348/294; 348/302; 348/308
(58) Field of Classification Search .................. 348/300, 348/301, 303, 307
See application file for complete search history.

(56) References Cited

U.S. PATENT DOCUMENTS

| | | | | |
|---|---|---|---|---|
| 6,115,066 | A * | 9/2000 | Gowda et al. ................. | 348/308 |
| 6,512,543 | B1 * | 1/2003 | Kuroda et al. ................ | 348/302 |
| 6,573,936 | B2 * | 6/2003 | Morris et al. ................. | 348/294 |
| 6,946,637 | B2 * | 9/2005 | Kochi et al. ................. | 250/208.1 |
| 6,967,685 | B2 * | 11/2005 | Hamasaki ..................... | 348/314 |
| 7,342,212 | B2 * | 3/2008 | Mentzer et al. ............. | 250/208.1 |
| 2002/0154347 | A1 | 10/2002 | Funakoshi et al. ............ | 358/513 |
| 2005/0195304 | A1 | 9/2005 | Nitta et al. ................... | 348/308 |
| 2005/0231624 | A1 | 10/2005 | Muramatsu et al. .......... | 348/311 |
| 2007/0046795 | A1 | 3/2007 | Yamashita ..................... | 348/294 |
| 2007/0076109 | A1 * | 4/2007 | Krymski ....................... | 348/300 |
| 2009/0244328 | A1 | 10/2009 | Yamashita ..................... | 348/241 |
| 2009/0256936 | A1 * | 10/2009 | Sonoda et al. ................ | 348/294 |

FOREIGN PATENT DOCUMENTS

| | | |
|---|---|---|
| JP | 62-154980 A | 7/1987 |
| JP | 2-107076 A | 4/1990 |
| JP | 9-055886 A | 2/1997 |
| JP | 2001-016508 A | 1/2001 |
| JP | 2002-320235 A | 10/2002 |
| JP | 2003-234967 A | 8/2003 |
| JP | 2005-278135 A | 10/2005 |
| JP | 2005-303648 A | 10/2005 |
| JP | 2006-25189 A | 1/2006 |
| JP | 2007/336374 A | 12/2007 |

* cited by examiner

*Primary Examiner* — Luong T Nguyen
(74) *Attorney, Agent, or Firm* — Fitzpatrick, Cella, Harper & Scinto

(57) ABSTRACT

A solid-state image pickup apparatus includes pixels arranged in a matrix, each pixel converting incident light into an analog electrical signal and outputting the analog electrical signal; AD converters in correspondence with individual columns, each AD converter converting the analog electrical signal from a corresponding pixel into a digital signal and outputting the digital signal from an output terminal; register circuits in correspondence with the individual columns, each register circuit receiving at an input terminal the digital signal output from the output terminal of a corresponding AD converter and storing the digital signal; and connection units, each of which connects the output terminal of a corresponding AD converter for one column to the input terminal of a corresponding register circuit for a different column or to connect the output terminal of a corresponding register circuit for one column to the input terminal of a corresponding register circuit for a different column.

8 Claims, 6 Drawing Sheets

SOLID-STATE IMAGE PICKUP APPARATUS AND METHOD FOR DRIVING THE SAME

BACKGROUND OF THE INVENTION

1. Field of the Invention

The present invention relates to solid-state image pickup apparatuses and methods, and more particularly, to a solid-state image pickup apparatus that includes analog-to-digital (AD) conversion circuits provided in correspondence with individual columns and that performs arithmetic processing on a plurality of digital signals obtained by the AD conversion circuits and to a method for driving the solid-state image pickup apparatus.

2. Description of the Related Art

In applications requiring high-speed performance for displaying video images or the like, known solid-state image pickup apparatuses that perform a so-called horizontally thinned-out reading are available. More specifically, these solid-state image pickup apparatuses read analog electrical signals, which are obtained by converting incident light at pixels arranged in a matrix, every other column (hereinafter, this type of reading serves as a synonym for a horizontally thinned-out operation).

An image sensor having AD conversion circuits provided in correspondence with individual columns and performing arithmetic processing on digital signals is disclosed in Japanese Patent Laid-Open No. 2006-025189. More specifically, two register circuits are provided for every column of pixels. After two different signal levels of one pixel are stored, the difference between the two different signal levels is calculated in a digital section of the image sensor.

When a horizontally thinned-out operation is performed using the circuit configuration disclosed in Japanese Patent Laid-Open No. 2006-025189, and arithmetic operations are performed on signals stored in a plurality of register circuits, the AD conversion circuits and the register circuits provided for "thinned-out" columns, that is, columns from which signals are not read out, do not contribute to the operation. Thus, in conventional arrangements, there is circuit utilization inefficiency.

SUMMARY OF THE INVENTION

According to an aspect of the present invention, there is provided a solid-state image pickup apparatus that includes a plurality of pixels arranged in a matrix, each of the plurality of pixels converting incident light into an analog electrical signal and outputting the analog electrical signal; a plurality of analog-to-digital converters provided in correspondence with individual columns of the plurality of pixels, each of the plurality of analog-to-digital converters converting the analog electrical signal from a corresponding one of the plurality of pixels into a digital signal and outputting the digital signal from an output terminal; a plurality of register circuits provided in correspondence with the individual columns of the plurality of pixels, each of the register circuits receiving at an input terminal the digital signal output from the output terminal of a corresponding one of the plurality of analog-to-digital converters and storing the digital signal; and a plurality of connection units, each of the plurality of connection units being configured to connect the output terminal of a corresponding one of the plurality of analog-to-digital converters, which is provided for one column, to the input terminal of a corresponding one of the plurality of register circuits, which is provided for a column different from the one column, or to connect the output terminal of a corresponding one of the plurality of register circuits, which is provided for one column, to the input terminal of a corresponding one of the plurality of register circuits, which is provided for a column different from the one column. The solid-state image pickup apparatus can further include an arithmetic processor configured to perform arithmetic processing on the digital signals output in parallel from the output terminals of the plurality of register circuits and to output a result signal.

The digital signals stored in the plurality of register circuits can be digital signals based on the pixels in the same column.

The digital signals stored in the plurality of register circuits can be digital signals read at different timings from the same pixel.

The arithmetic processing can include at least one of addition, subtraction, and averaging.

According to another aspect of the present invention, there is provided a method for driving the solid-state image pickup apparatus. The method includes, when performing a horizontally thinned-out reading, transferring the digital signal based on a pixel in a column that is read to a register circuit in a column that is not read.

According to aspects of the present invention, even when a horizontally thinned-out operation is performed and arithmetic operations are performed on digital signals stored in a plurality of register circuits, the number of register circuits that do not contribute to the operation can be reduced, and the circuit utilization efficiency can be improved.

Further features of the present invention will become apparent from the following description of exemplary embodiments with reference to the attached drawings.

DESCRIPTION OF THE EMBODIMENTS

Exemplary embodiments of the present invention are described in detail below.

First Embodiment

The circuit configuration of a solid-state image pickup apparatus according to an exemplary embodiment of the present invention is described below. Subsequently, an operation in which, in a horizontally thinned-out operation, digital signals stored in register circuits in columns that are read are transferred to register circuits in columns that are not read, and in which arithmetic processing is performed on a plurality of digital signals based on pixels in the same column but different rows, is described.

Figure 1:
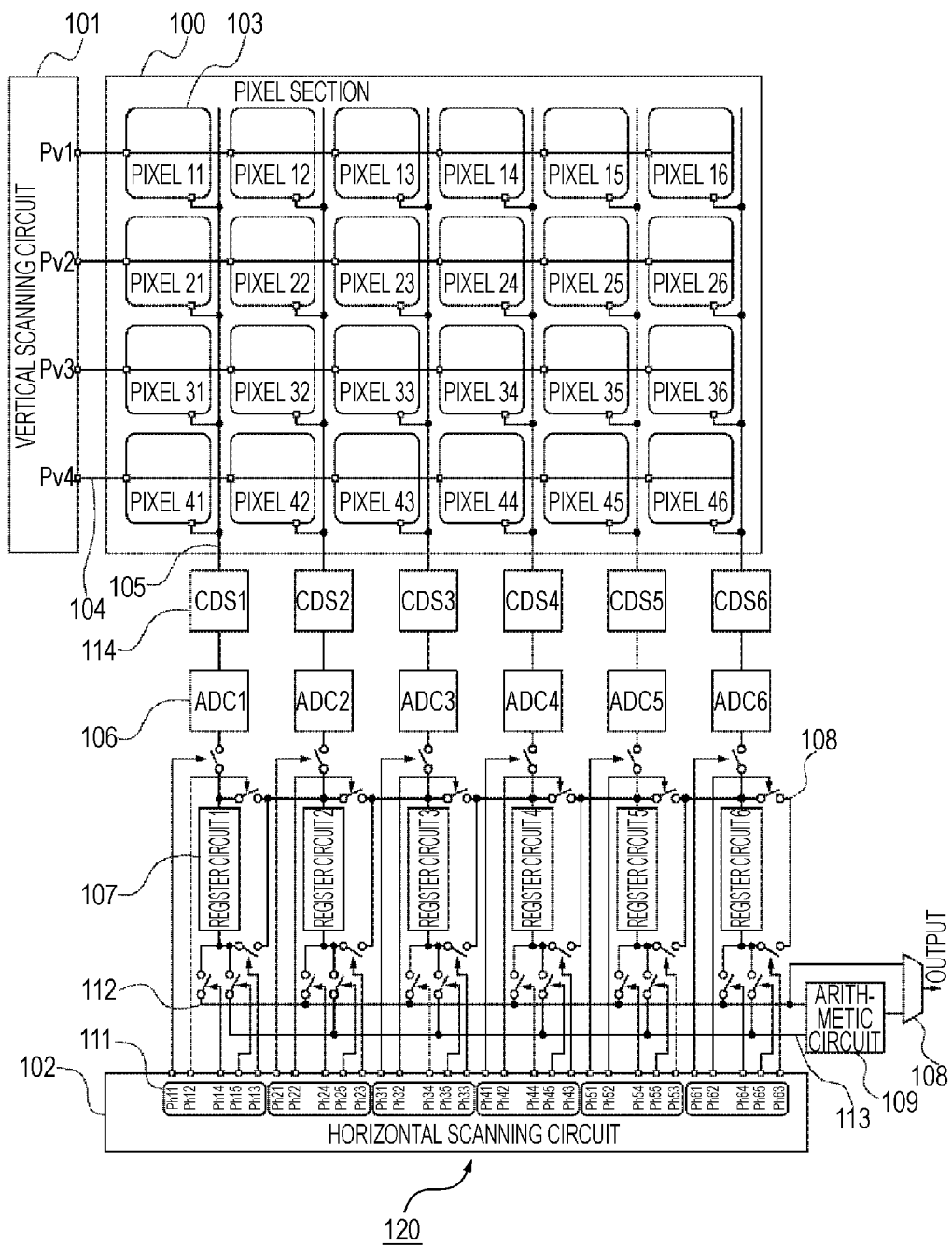
FIG. 1 is a block diagram of a solid-state image pickup apparatus according to exemplary embodiments of the present invention.

FIG. 1 is a block diagram showing a solid-state image pickup apparatus 120 according to an exemplary embodiment of the present invention. A pixel section 100 includes pixels 103 arranged in a matrix having rows and columns. Each row includes six pixels, and each column includes four pixels. More specifically, the pixels 103 include pixels 11 to 16, 21 to 26, 31 to 36, and 41 to 46. Each of the pixels 103 includes a photoelectric conversion element that converts incident light into electric charge and outputs the electric charge as an analog electrical signal. The pixels 103 constituting each row are commonly connected to a vertical scanning circuit 101 via a corresponding row selection line 104. That is, the six pixels 103 of a row connected to a corresponding selected one of the row selection lines 104 are simultaneously selected. Row selection signals Pv1 to Pv4 are sequentially pulled high, thereby selecting the pixels 103 in the first to fourth rows, one row at a time.

Analog electrical signals output from the pixels 103 in a row selected by a corresponding one of the row selection lines 104 are input to correlated double sampling (CDS) circuits 114 provided in correspondence with the individual columns via corresponding vertical output lines 105, each of which is commonly connected to the pixels 103 in a corresponding one of the columns. The CDS circuits 114 include CDS circuits 1 to 6. Each of the CDS circuits 114 cancels noise by performing differential processing on a noise level and a signal level included in a corresponding one of the analog electrical signals. In FIG. 1, each of the vertical output lines 105 is directly connected to a corresponding one of the CDS circuits 114. However, an amplifier for amplifying an analog electrical signal from a pixel may be connected between the pixel section 100 and each of the CDS circuits 114, thereby reducing the effect of a noise component superimposed on the analog electrical signal. Noise-cancelled analog electrical signals in the individual columns are input to AD converters (ADC) 106 provided in correspondence with the individual columns. The ADCs 106 include ADCs 1 to 6. The analog electrical signals input to the ADCs 106 are converted into digital signals. The digital signals are output from output terminals of the ADCs 106 to input terminals of register circuits 107 provided in correspondence with the individual columns of pixels. The register circuits 107 receive and store the digital signals. The register circuits 107 include register circuits 1 to 6.

The digital signals stored in the register circuits 107 are output from output terminals thereof to horizontal output lines 112 and 113 by appropriately selecting the register circuits 107 using a horizontal scanning circuit 102. For example, when the horizontal scanning circuit 102 sequentially pulls column selection signals Ph14, Ph24, . . . high in this order, the digital signals stored in the register circuits 1 to 6 are sequentially output in this order to the horizontal output line 112. The digital signals output to the horizontal output line 112 are output via a selector 108.

The horizontal scanning circuit 102 sequentially pulls column selection signals Ph15, Ph25, . . . high in this order, thereby sequentially outputting the digital signals stored in the register circuits 1 to 6 in this order to the horizontal output line 113. When two digital signals are simultaneously output to the horizontal output lines 112 and 113, an arithmetic circuit 109, to which the horizontal output lines 112 and 113 are connected in parallel, performs arithmetic processing including addition, subtraction, and averaging, on the two digital signals and outputs the arithmetic processing result via the selector 108. In FIG. 1, the two horizontal output lines 112 and 113 are connected to the arithmetic circuit 109. However, the configuration may include an arithmetic circuit to which three or more horizontal output lines are connected and which performs arithmetic processing on three or more digital signals.

In the present embodiment, one of a signal obtained by performing arithmetic processing on two digital signals read at the horizontal output lines 112 and 113, and the original digital signal that is read at the horizontal output line 112 and that has not been processed, is selected and output using the selector 108.

In the present embodiment, the six pixel columns are organized into two blocks, each block including three pixel columns. However, the same advantages can be achieved in the case where the number of columns in each block is increased or the six pixel columns are organized into three or more blocks.

Figure 2:
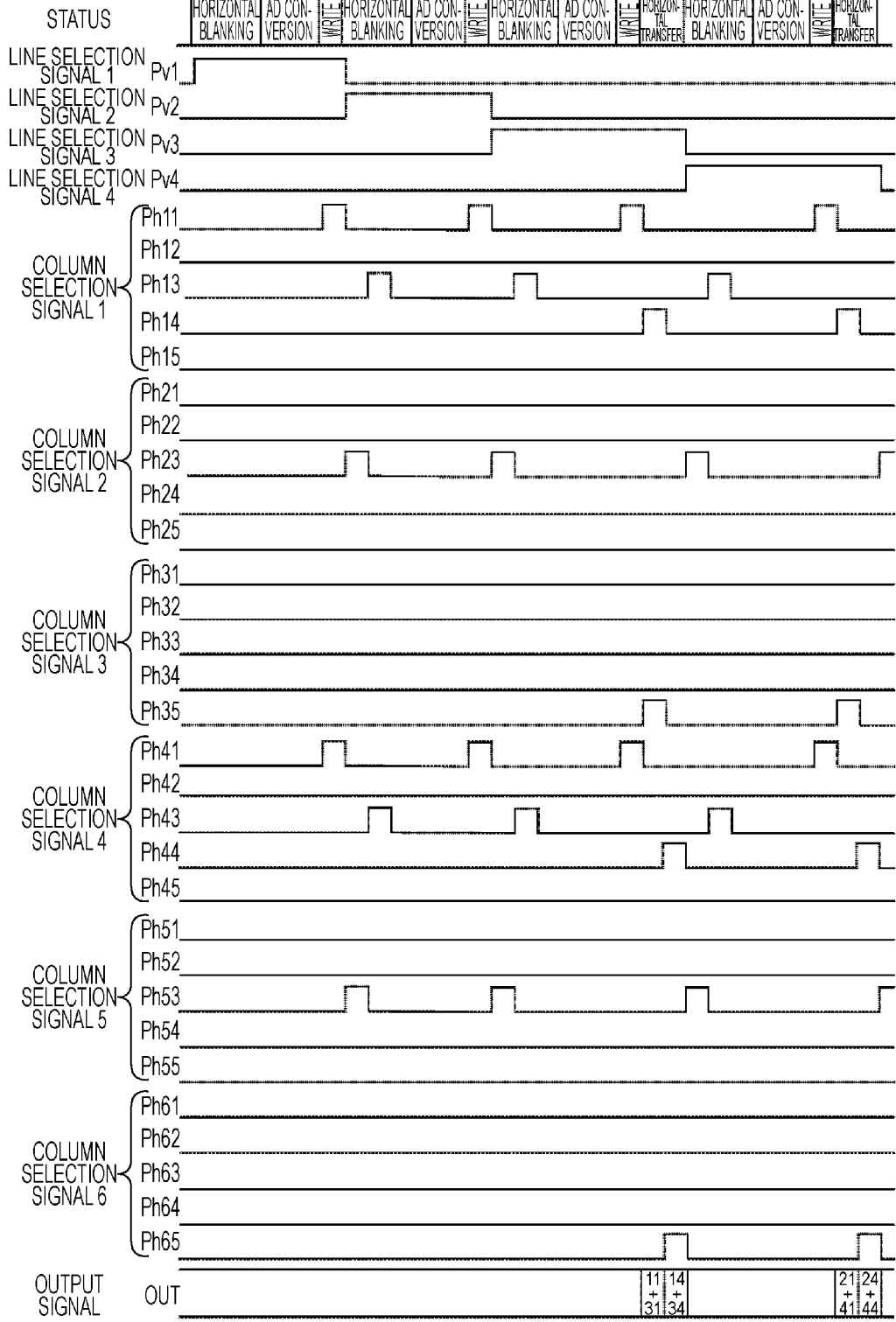
FIG. 2 is a timing chart showing a process of driving a solid-state image pickup apparatus according to the first exemplary embodiment of the present invention.

FIG. 2 is a timing chart illustrating the operation of the solid-state image pickup apparatus 120 shown in FIG. 1, in which a horizontally thinned-out operation is performed while performing an operation of adding signals from two pixels in the same column. The following description will be given with reference to FIG. 2. In a default state, it is assumed that data written in the register circuits 1 to 6 is zero.

The description concerns a column of pixels including the pixels 11, 21, 31, and 41. At the beginning, the row selection signal Pv1 is pulled high, and the first-row reading operation starts. In a horizontal blanking operation, an analog electrical signal is output from the pixel 11 to a corresponding one of the vertical output lines 105, and the CDS circuit 1 cancels noise. In an AD conversion operation, the noise-cancelled signal is AD-converted by the ADC 1 into a digital signal, and the digital signal is output. In a write operation, a column selection signal Ph11 reaches a high level, and the ADC 1 becomes connected to the register circuit 1. As a result, the digital signal is written into the register circuit 1.

Thereafter, the row selection signal Pv1 reaches a low level, and, in turn, the row selection signal Pv2 reaches a high level. As a result, the second-row reading operation starts. In the second-row horizontal blanking operation, a transfer operation from the register circuit 1 to the register circuit 2 is performed in parallel with the reading of a pixel in the second row. A column selection signal Ph23 is pulled high, and a digital signal stored in the register circuit 2 (zero in this case) is transferred to the register circuit 3. Next, a column selection signal Ph13 is pulled high, and the digital signal stored in the register circuit 1, which is based on the pixel 11, is transferred to the register circuit 2.

An analog electrical signal from the pixel 21, which has been noise-cancelled by the CDS circuit 1 in the horizontal blanking operation, is converted into a digital signal in the AD conversion operation. Thereafter in the write operation, the column selection signal Ph11 is pulled high, and the digital signal is written into the register circuit 1. After the writing of the digital signal into the register circuit 1 is completed, the row selection signal Pv2 reaches a low level, and the second-row operation is completed.

The third-row operation starts when the row selection signal Pv3 reaches a high level. In the horizontal blanking operation, the digital signal stored in the register circuit 2, that is, the digital signal based on the pixel 11, is transferred to the register circuit 3. Thereafter, the column selection signal Ph13 reaches a high level, and the digital signal stored in the register circuit 1, that is, the digital signal based on the pixel 21, is transferred to the register circuit 2. Similarly in the third-row horizontal blanking operation, an analog electrical signal from the pixel 31 is read to a corresponding one of the vertical output lines 105, and the CDS circuit 1 cancels noise. In the AD conversion operation, the noise-cancelled analog electrical signal is converted by the ADC 1 into a digital signal, and the digital signal is output. In the write operation, the digital signal is written into the register circuit 1.

Thereafter in the horizontal transfer operation, column selection signals Ph14 and Ph35 are simultaneously pulled high, and the signals stored in the register circuits 1 and 3, that is, the digital signals based on the pixels 31 and 11, are output to the horizontal output lines 112 and 113, respectively. The two digital signals input in parallel with the arithmetic circuit 109 are added in the arithmetic circuit 109, and the added result is output via the selector 108. Here, the signal output from the selector 108 is schematically illustrated in FIG. 2 as, for example, "11+31", which indicates that this output signal is obtained by adding the digital signal based on the pixel 11 and the digital signal based on the pixel 31.

The operation for the fourth row and so forth is similar to the operation for the third row. Digital signals based on pixels in the same column are added every other row and the added result is output. Such addition done every other row can be used to add signals from pixels of the same color in a case where color filters with a repeating unit of 2×2, as in a Bayer array, are provided on a pixel section.

The above description concerns the left three columns of the six pixels 103 in each of the horizontal rows. For the right three columns, an operation at the same timing as that of the left three columns is performed except that the timing to output digital signals stored in the register circuits 4 and 6 to the horizontal output lines 112 and 113, respectively, in the horizontal transfer operation is different from that of the left three columns. In this case, addition has been described by way of example. However, the arithmetic processing performed in the arithmetic circuit 109 may include averaging or differential processing.

Figure 3:
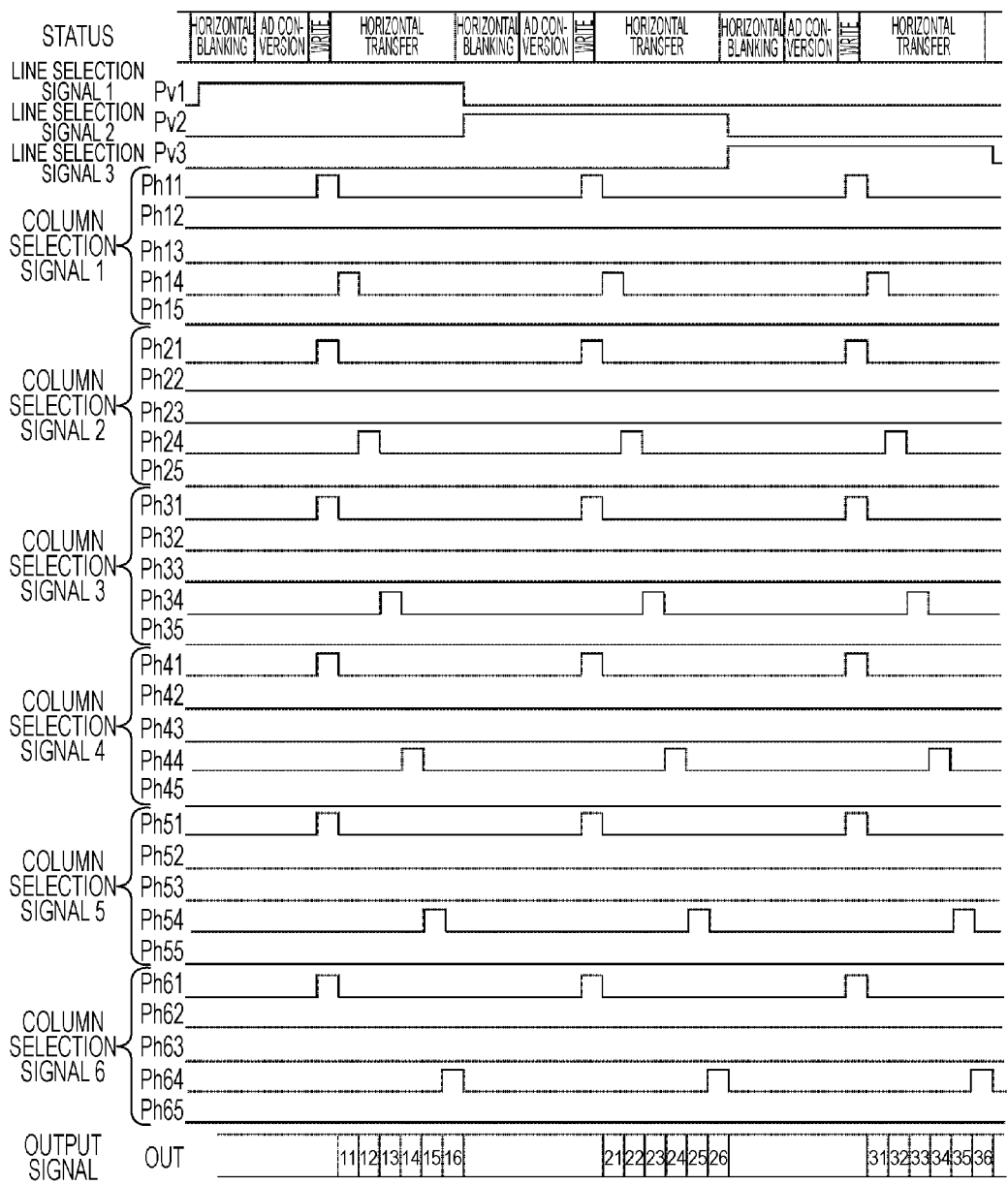
FIG. 3 is another timing chart showing the process of driving the solid-state image pickup apparatus according to the first exemplary embodiment of the present invention.

Next, a method for driving the solid-state image pickup apparatus 120 shown in FIG. 1 in a case where signals are output without performing a thinned-out operation or addition is described using FIG. 3. This driving method is performed when high resolution is required, such as when picking up still images or the like.

In this driving method of reading signals from all the pixels, horizontal transfer operations are performed when reading each row. In the first-row horizontal blanking operation, analog electrical signals from the pixels 103 in the first row are noise-cancelled by the corresponding CDS circuits 114. In the AD conversion operation, the noise-cancelled analog signals are converted by the corresponding ADCs 106 into noise-cancelled digital signals.

Thereafter in the write operation, the column selection signals Ph11, Ph21, . . . are simultaneously pulled high, and the digital signals output from the ADCs 106 in the individual columns are stored in the register circuits 107 in the individual columns.

Thereafter in the horizontal transfer operation, the column selection signals Ph14, Ph24, . . . are pulled high one at a time, and the digital signals stored in the register circuits 107 are sequentially output to the horizontal output line 112. The digital signals output to the horizontal output line 112 are output via the selector 108 to outside of the solid-state image pickup apparatus 120.

Similar operations are performed for the second row and so forth. Accordingly, signals from all the pixels 103 in the solid-state image pickup apparatus 120 shown in FIG. 1 can be sequentially output.

According to the present embodiment of the invention described above, there is provided a connection unit for connecting an output terminal of a register circuit provided for each of a plurality of columns to an input terminal of a register circuit provided for a column different from the foregoing column. Therefore, a horizontally thinned-out addition operation can be performed with fewer register circuits that do not contribute to the operation, compared with known configurations. Accordingly, the circuit utilization efficiency can be improved. The connection unit in the present embodiment refers to, for the pixels 103 in the n-th column in FIG. 1, a channel that becomes electrically connected when the column selection signal Phn3 is pulled high. By performing the driving method shown in FIG. 3, signals from all the pixels 103 in the solid-state image pickup apparatus 120 shown in FIG. 1 can be read.

Second Embodiment

Solid-state image pickup apparatuses that expand a dynamic range by reading signals based on charges that are overflow charges from photoelectric conversion elements and signals based on charges that are not overflow charges from the photoelectric conversion elements at different timings and performing arithmetic processing including amplification and addition on these signals are generally known. The following description concerns a driving method for performing arithmetic processing on a plurality of signals obtained from the same pixel by transferring, in a horizontally thinned-out operation, digital signals stored in register circuits for columns of pixels that are read to register circuits for columns of pixels that are not read.

Figure 4:
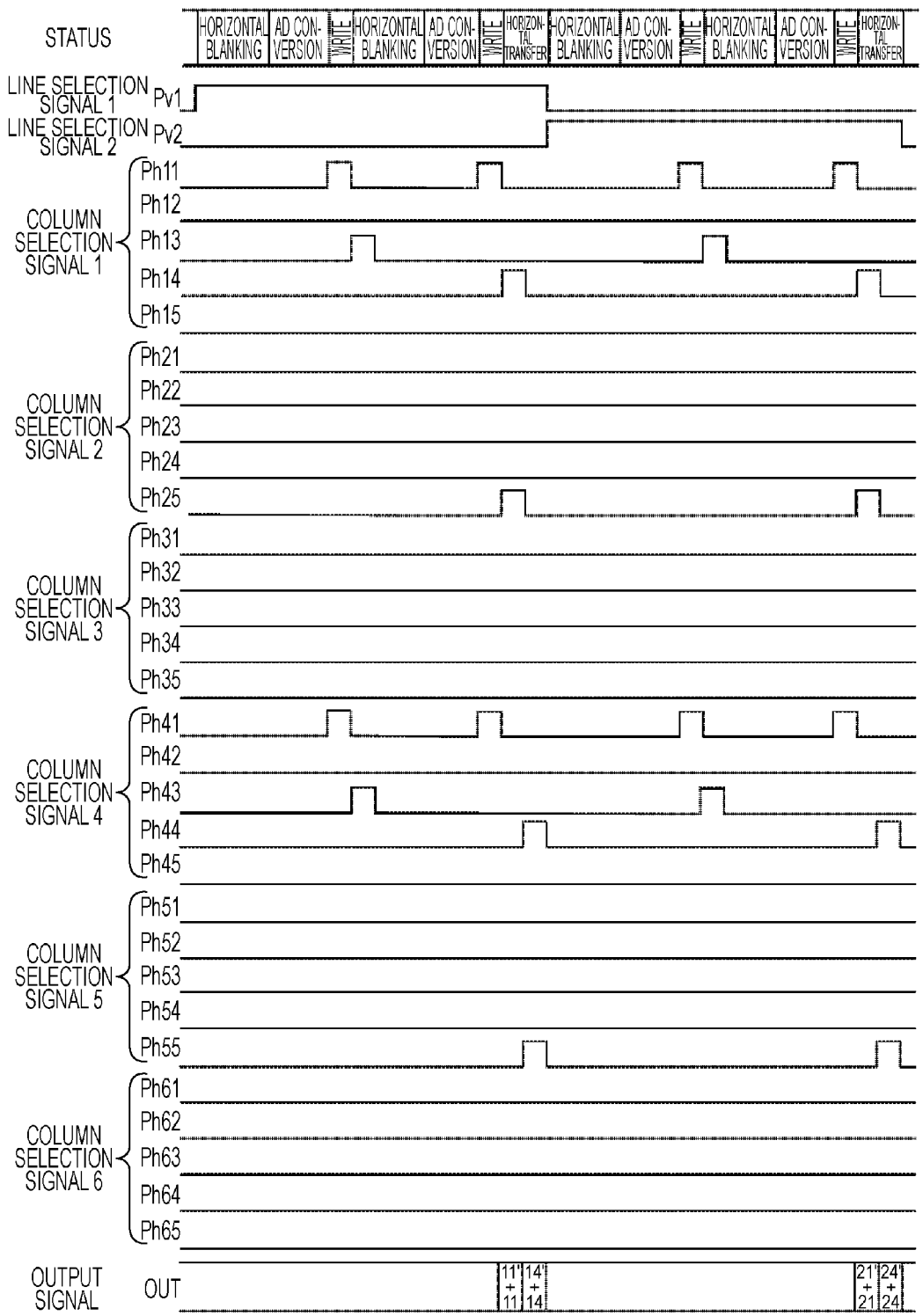
FIG. 4 is a timing chart showing a process of driving a solid-state image pickup apparatus according to the second exemplary embodiment of the present invention.

FIG. 4 is a timing chart illustrating a driving method according to another exemplary embodiment of the present invention. That is, FIG. 4 illustrates a horizontally thinned-out operation in which, among six pixels in each horizontal row and four pixels in each vertical column, pixels in the second, third, fifth, and sixth columns are not to be read. The reading operation is performed twice for each of the pixels in the first and fourth columns to be read, thereby obtaining two different signals. Arithmetic processing is performed on these two different signals, and the result is output to outside of the solid-state image pickup apparatus.

Referring to FIG. 4, the pixels in the first row are selected while the row selection signal Pv1 is at a high level. In the first horizontal blanking operation of the first row, overflow charges from the photoelectric conversion elements in the pixels in the first row are converted into analog electrical signals, and the analog electrical signals are read to the corresponding vertical output lines 105. Thereafter, the read analog electrical signals are converted into digital signals in the first AD conversion operation of the first row. Each of the digital signals is stored in the corresponding register circuit 1 in the first write operation of the first row.

Next, in the second horizontal blanking operation of the first row, analog electrical signals that have not been read in the first horizontal blanking operation of the first row, that is, analog electrical signals based on charges that are not overflow charges from the photoelectric conversion elements, are read to the corresponding vertical output lines 105. In parallel to this, the column selection signal Ph13 reaches a high level, and the digital signal stored in the register circuit 1 in the write operation for the first time is transferred to the register circuit 2. The analog electrical signals read in the second horizontal blanking operation of the first row are converted into digital signals in the second AD conversion operation of the first row, and each of the digital signals is stored in the corresponding register circuit 1 in the second write operation of the first row.

The digital signals stored in the register circuits 1 and 2 are output to the horizontal output lines 112 and 113, respectively, in the horizontal transfer operation. The arithmetic circuit 109 performs arithmetic processing such as addition and amplification on the digital signals, thereby generating a pixel signal with a wide dynamic range. These digital signals are represented as "11'+11" and such in FIG. 4. For example, 11' and 11 that appears in the output signal in FIG. 4 denotes an overflow signal from the photoelectric conversion element and a signal that is not an overflow signal from the photoelectric conversion element, respectively.

Similar operations are performed for the second row and so forth. Accordingly, an image with a wide dynamic range can be obtained.

According to the present embodiment of the invention described above, there is provided a connection unit for connecting an output terminal of a register circuit provided for each of a plurality of columns to an input terminal of a register circuit provided for a column different from the foregoing column. Therefore, when a horizontally thinned-out addition operation is performed while obtaining an image with a wide dynamic range, the number of register circuits that do not contribute to the operation can be reduced, compared with known configurations. Accordingly, the circuit utilization efficiency can be improved. The connection unit in the present embodiment refers to, for the pixels 103 in the n-th column in FIG. 1, a channel that connects different register circuits when the column selection signal Phn3 is pulled high.

Third Embodiment

A third exemplary embodiment of the present invention is described below using FIG. 5. The present embodiment concerns a horizontally thinned-out operation in which a digital signal based on a light-shielded pixel in a column of pixels that are read is stored in a register circuit for a column of pixels that are not read, and a differential signal between this digital signal and a digital signal based on an effective pixel, which is stored in the register circuit for the column of pixels that are read, is output. More specifically, the pixels in the first row selected by the row selection signal Pv1 are light-shielded pixels (optical black pixels or OB pixels) that output analog electrical signals independent of light quantity. It is assumed that only pixels in the odd-numbered columns are read, and the description concerns the pixels in the first column.

Figure 5:
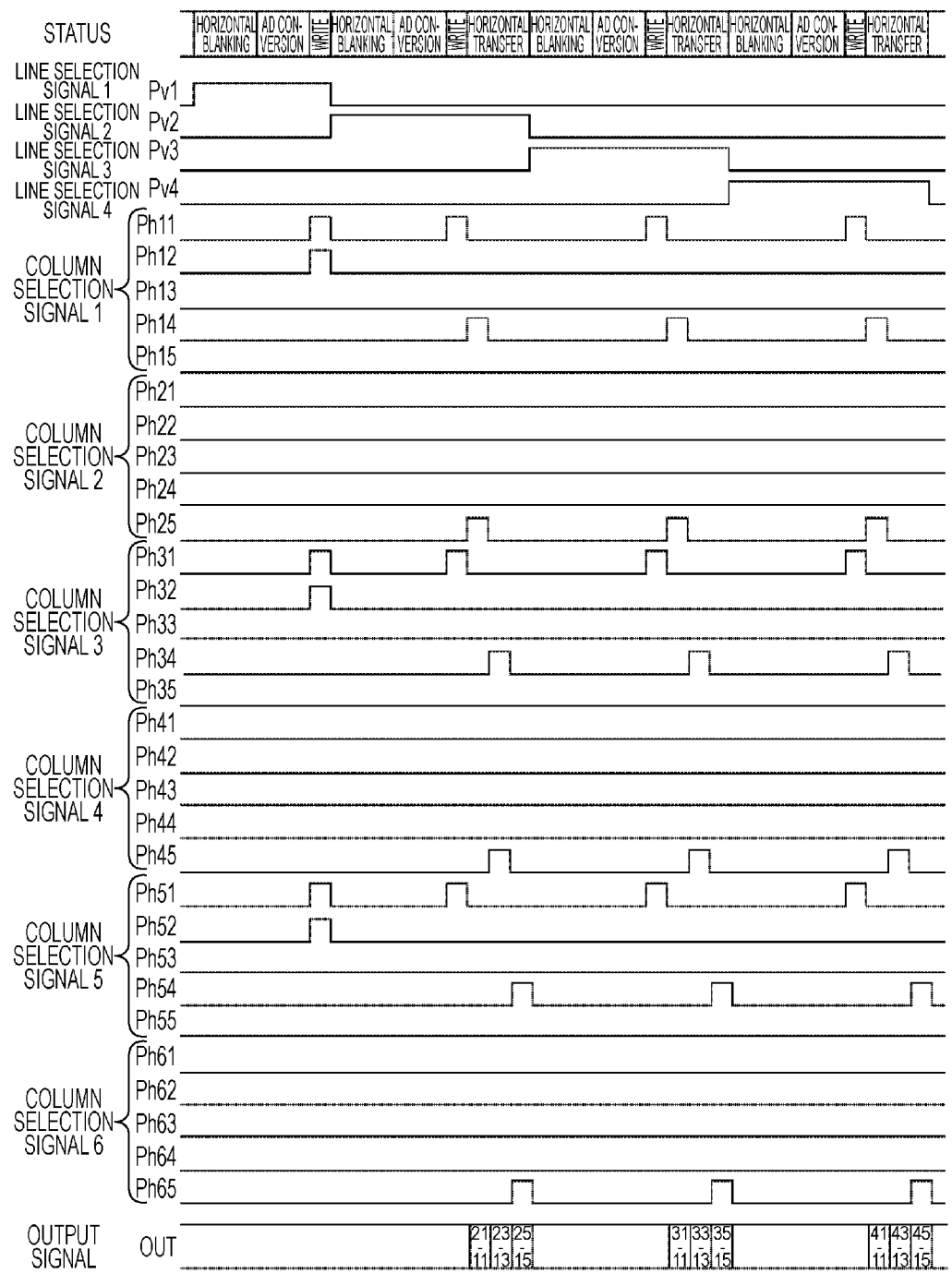
FIG. 5 is a timing chart showing a process of driving a solid-state image pickup apparatus according to the third exemplary embodiment of the present invention.

Referring to FIG. 5, in the first-row horizontal blanking operation, as in the foregoing embodiments, an analog electrical signal is read from the pixel 11, which is an OB pixel, and noise of the analog signal is cancelled in the CDS circuit 1. Thereafter in the AD conversion operation, the noise-cancelled analog signal is converted into a digital signal. In the write operation, the digital signal is stored in the register circuits 1 and 2 when the column selection signals Ph11 and Ph12 reach a high level.

In the second-row selection period in which the row selection signal Pv2 is at a high level, an analog electrical signal based on the pixel 21 is noise-cancelled in the horizontal blanking operation and converted into a digital signal in the AD conversion operation. In the write operation, the column selection signal Ph11 reaches a high level, and the digital signal based on the pixel 21, which is an effective pixel, is stored in the register circuit 1.

In the horizontal transfer operation, the column selection signals Ph14 and Ph25 simultaneously reach a high level, and the digital signal based on the pixel 21 is output to the horizontal output line 112, and the digital signal based on the pixel 11, which is an OB pixel, is output to the horizontal output line 113. These digital signals are input to the arithmetic circuit 109, and a signal generated by performing arithmetic processing, including subtraction of the digital signal based on the OB signal from the digital signal based on the pixel 21, is output via the selector 108.

For the third row and so forth, a digital signal based on an effective pixel is stored in the register circuit 1 in the write operation, and a differential signal is calculated by subtracting a digital signal based on an OB pixel from the digital signal based on the effective pixel in the horizontal transfer operation. This operation is repeated for the third row and so forth.

According to the present embodiment of the invention described above, there is provided a connection unit for connecting an output terminal of an AD converter provided for each of a plurality of columns to an input terminal of a register circuit provided for a column different from the foregoing column. Therefore, when a horizontally thinned-out addition operation is performed while performing correction processing using OB pixels, the number of register circuits that do not contribute to the operation can be reduced, compared with known configurations. Accordingly, the circuit utilization efficiency can be improved. The connection unit in the present embodiment refers to channels that become electrically connected when the column selection signals Ph12, Ph22, . . . are pulled high.

Although configurations including the selector 108 have been described in the foregoing embodiments, the selector 108 may be omitted by configuring the arithmetic circuit 109 to output a signal without performing arithmetic processing if, for example, a signal is output to only one of the horizontal output lines 112 and 113.

Fourth Embodiment

Figure 6:
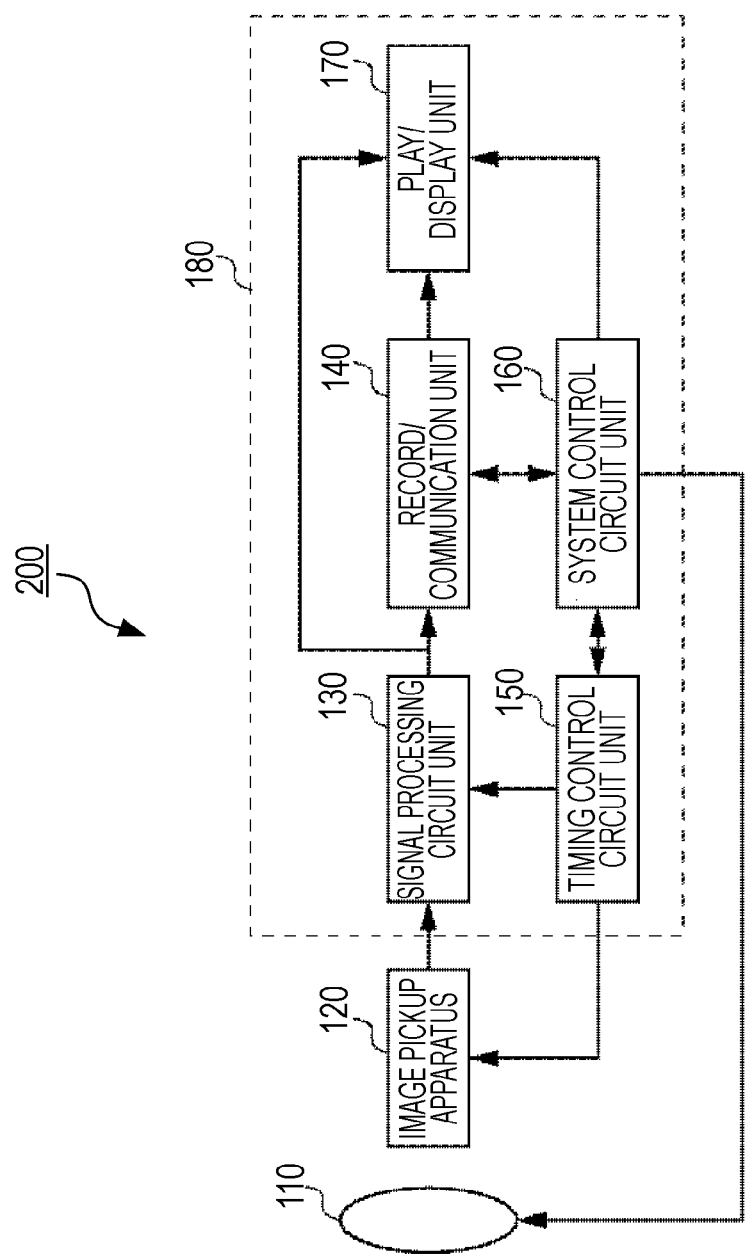
FIG. 6 is a block diagram of an image pickup system according to the fourth exemplary embodiment of the present invention.

The schematic configuration and the schematic operation of an image pickup system 200 according to a fourth exemplary embodiment of the present invention are described below using FIG. 6. FIG. 6 is a block diagram of the image pickup system 200 according to the present embodiment.

The image pickup system 200 includes an optical system 110, a solid-state image pickup apparatus 120, and a signal processor 180. The signal processor 180 includes a signal processing circuit unit 130, a record/communication unit 140, a timing control circuit unit 150, a system control circuit unit 160, and a play/display unit 170.

The optical system 110 forms an image of an object on a pixel array, which is an image pickup surface of the solid-state image pickup apparatus 120.

The solid-state image pickup apparatus 120 is, for example, the solid-state image pickup apparatus according to the first exemplary embodiment. The solid-state image pickup apparatus 120 converts the image of the object, which is formed on the pixel array, into an image signal. The solid-state image pickup apparatus 120 reads the image signal from the pixel array and outputs the image signal to the signal processing circuit unit 130.

The signal processing circuit unit 130 applies signal processing, such as compression processing of image data, on the image signal supplied from the solid-state image pickup apparatus 120 in accordance with a predetermined method. The signal processing circuit unit 130 supplies the processed image data to the record/communication unit 140 and the play/display unit 170.

The record/communication unit 140 records the image data supplied from the signal processing circuit unit 130 in a recording medium (not shown) or transmits the image data to an external apparatus (not shown). Alternatively, the record/communication unit 140 reads the image data from the recording medium and supplies the image data to the play/display unit 170, or the record/communication unit 140 receives a predetermined instruction from an input unit (not shown) and supplies the instruction to the system control circuit unit 160.

The play/display unit 170 displays the image data supplied from the signal processing circuit unit 130 or the record/communication unit 140 on a display device.

The timing control circuit unit 150 supplies a signal for controlling the timing of driving the solid-state image pickup apparatus 120. The timing control circuit unit 150 plays the role of a mode switching unit. For example, the timing control circuit unit 150 supplies a signal for driving the solid-state image pickup apparatus 120 in a mode for performing a horizontally thinned-out operation or in a mode for reading signals from all the pixels.

The system control circuit unit 160 receives predetermined instruction information from the record/communication unit 140. In response to the predetermined instruction information, the system control circuit unit 160 controls the optical system 110, the record/communication unit 140, the play/display unit 170, and the timing control circuit unit 150. For example, the system control circuit unit 160 controls the optical system 110, the record/communication unit 140, the play/display unit 170, and the timing control circuit unit 150 in accordance with the all-pixel reading mode or the thinned-out reading mode.

According to the present embodiment, in the thinned-out operation, digital signals can be stored in register circuits provided for columns of pixels from which no signals are read. Accordingly, a horizontally thinned-out addition operation can be performed with fewer register circuits that do not contribute to the operation. The circuit utilization efficiency is improved, and arithmetic processing including addition, averaging, and subtraction (difference calculation) can be performed.

In the foregoing embodiments, a configuration of the solid-state image pickup apparatus 120 including the arithmetic circuit 109 and the selector 108 has been described. However, these elements need not be provided inside the solid-state image pickup apparatus 120. For example, referring to FIG. 6, these elements may be provided in the signal processing circuit unit 130. In this case, the area of a semiconductor substrate for the solid-state image pickup apparatus 120 can be reduced, and the foregoing advantages can be achieved. What is important in the exemplary embodiments of the present invention is that, when a horizontally thinned-out operation is performed, the configuration is capable of storing digital signals in register circuits provided for columns of pixels from which signals are not to be read.

Although the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2007-066771, filed Mar. 15, 2007, and Japanese Patent Application No. 2007-259854, filed Oct. 3, 2007, which are hereby incorporated by reference herein in their entirety.

What is claimed is:

1. A solid-state image pickup apparatus comprising:
a plurality of pixels arranged in a matrix of individual rows and individual columns, each of the plurality of pixels converting incident light into an analog electrical signal and outputting the analog electrical signal;
AD converters provided in correspondence with the individual columns of the plurality of pixels, each of the AD converters converting the analog electrical signal from a corresponding one of the plurality of pixels into a digital signal and outputting the digital signal;
register circuits provided in correspondence with the individual columns of the plurality of pixels, each of the register circuits receiving a digital signal from a selected one of the AD converters and storing the digital signal, wherein each of the individual columns is respectively provided with one of the AD converters and one of the register circuits; and
a horizontal scanning circuit that controls selective inputting of digital signals to the register circuits, and controls selective inputting of digital signals to an arithmetic circuit,
wherein the horizontal scanning circuit causes a digital signal outputted from an AD converter corresponding to a column of the matrix to be selectively inputted to a register circuit corresponding to the column of the matrix or a register circuit corresponding to another column of the matrix, and
wherein the horizontal scanning circuit causes a digital signal outputted from a register circuit corresponding to a column of the matrix to be selectively inputted to the arithmetic circuit or to a register circuit corresponding to another column of the matrix.

2. The solid-state image pickup apparatus according to claim 1, wherein the register circuits individually store digital signals based on pixels in a same column.

3. The solid-state image pickup apparatus according to claim 1, wherein the arithmetic circuit performs arithmetic processing on plural digital signals inputted simultaneously from plural register circuits, and outputs a resultant signal.

4. The solid-state image pickup apparatus according to claim 3, wherein the arithmetic processing includes at least one of addition, subtraction, and averaging.

5. The solid-state image pickup apparatus according to claim 1, wherein the horizontal scanning circuit performs a horizontally thinned-out reading by causing a digital signal based on a pixel in a column that is read to be transferred to a register circuit in a column that is not read.

6. The solid-state image pickup apparatus according to claim 1, further comprising a vertical scanning circuit that controls outputting of signals from each row of the matrix to the AD converters.

7. The solid-state image pickup apparatus according to claim 3, further comprising an output selector for selecting the resulting signal outputted from the arithmetic circuit or one of the digital signals from the plural register circuits.

8. The solid-state image pickup apparatus according to claim 1, wherein the horizontal scanning circuit causes a first digital signal outputted from a first register circuit of the register circuits to be selectively inputted to the arithmetic circuit via a first line, and causes a second digital signal outputted from a second register circuit of the register circuits to be selectively inputted to the arithmetic circuit via a second line, the first and second register circuits corresponding to different columns of the matrix, and the first and second digital signals being inputted to the arithmetic circuit simultaneously.

* * * * *